(12) United States Patent
Huang et al.

(10) Patent No.: US 11,508,089 B2
(45) Date of Patent: Nov. 22, 2022

(54) LIDAR ASSISTED WHEEL ENCODER TO CAMERA CALIBRATION

(71) Applicant: Black Sesame International Holding Limited, Santa Clara, CA (US)

(72) Inventors: Yu Huang, Sunnyvale, CA (US); Ruihui Di, Castro Valley, CA (US); Zheng Qi, Cupertino, CA (US); Jizhang Shan, Los Gatos, CA (US)

(73) Assignee: Black Sesame Technologies Inc., San Jose, CA (US)

( * ) Notice: Subject to any disclaimer, the term of this patent is extended or adjusted under 35 U.S.C. 154(b) by 0 days.

(21) Appl. No.: 17/193,852

(22) Filed: Mar. 5, 2021

(65) Prior Publication Data

US 2022/0284626 A1 Sep. 8, 2022

(51) Int. Cl.
*G06T 7/80* (2017.01)
*G01S 17/89* (2020.01)
*H04N 7/18* (2006.01)

(52) U.S. Cl.
CPC .............. *G06T 7/80* (2017.01); *G01S 17/89* (2013.01); *H04N 7/18* (2013.01); *G06T 2207/10028* (2013.01)

(58) Field of Classification Search
CPC . G06T 7/80; G06T 2207/10028; G01S 17/89; H04N 7/18
See application file for complete search history.

(56) References Cited

U.S. PATENT DOCUMENTS

| | | | |
|---|---|---|---|
| 10,365,364 B1* | 7/2019 | Prados | G01S 13/865 |
| 10,371,797 B1* | 8/2019 | Prados | G01S 13/10 |
| 10,609,360 B2 | 3/2020 | Chang et al. | |
| 11,127,430 B1* | 9/2021 | Nave | G06F 3/0686 |
| 2015/0016777 A1* | 1/2015 | Abovitz | G02B 27/0093 385/37 |
| 2015/0178939 A1* | 6/2015 | Bradski | H04N 13/00 345/633 |
| 2016/0331475 A1* | 11/2016 | Popovic | A61B 1/0016 |
| 2018/0139431 A1* | 5/2018 | Simek | H04N 13/254 |
| 2018/0303574 A1* | 10/2018 | Ramirez Luna | H04N 13/156 |
| 2019/0094981 A1* | 3/2019 | Bradski | G06F 3/017 |
| 2019/0329407 A1* | 10/2019 | Qi | G05D 1/0234 |
| 2020/0008899 A1* | 1/2020 | Tripathi | A61B 90/20 |
| 2020/0126248 A1* | 4/2020 | Nitzan | G06T 7/001 |
| 2021/0082149 A1* | 3/2021 | Sheorey | G06T 3/4007 |

(Continued)

OTHER PUBLICATIONS

Tsai, R Y., and Reimar K. L. "A new technique for fully autonomous and efficient 3D robotics hand/eye calibration." IEEE T-RA: 345-358, 1989.

(Continued)

*Primary Examiner* — Zaihan Jiang
(74) *Attorney, Agent, or Firm* — Timothy T. Wang; Ni, Wang & Massand, PLLC (57) ABSTRACT

A method of wheel encoder to camera calibration, including receiving a LiDAR (Light Detection and Ranging) signal, receiving a camera signal, receiving a wheel encoder signal, calibrating the camera signal to the LiDAR signal, calibrating the wheel encoder signal to the LiDAR signal and calibrating the camera signal to the wheel encoder signal based on the calibration of the camera signal to the LiDAR signal and the wheel encoder signal to the LiDAR signal.

5 Claims, 7 Drawing Sheets

(56) References Cited

U.S. PATENT DOCUMENTS

2021/0291844 A1* 9/2021 Bower ................ B60W 40/105
2021/0320639 A1* 10/2021 Meng .................. H03H 7/0153

OTHER PUBLICATIONS

Daniilidis, K. "Hand-eye calibration using dual quaternions." IJRA:286-298, 1999.

Censi, A. "An accurate closed-form estimate of ICP's covariance." IEEE ICRA, 2007.

Guo, C. X., Mirzaei, F. M., & Roumeliotis, S. I. "An analytical least-squares solution to the odometer-camera extrinsic calibration problem". IEEE ICRA, 2012.

Heng, L., Li, B., & Pollefeys, M. "Camodocal: Automatic intrinsic and extrinsic calibration of a rig with multiple generic cameras and odometry". IEEE IRS, 2013.

Censi, A., Franchi, A., Marchionni, L. & Oriolo, G. "Simultaneous calibration of odometry and sensor parameters for mobile robots". IEEE Transactions on Robotics, 29, 475-492, 2013.

* cited by examiner

LIDAR ASSISTED WHEEL ENCODER TO CAMERA CALIBRATION

BACKGROUND

Technical Field

The instant disclosure is related to wheel encoder to camera calibration and more specifically to LiDAR (Light Detection and Ranging) assisted wheel encoder to camera calibration.

Background

Currently, methods to calibrate a wheel encoder to camera are either cumbersome or to lack a robust estimation to solve hand-eye calibration.

SUMMARY

An example method of wheel encoder to camera calibration, including receiving a LiDAR (Light Detection and Ranging) signal, receiving a camera signal, receiving a wheel encoder signal, calibrating the camera signal to the LiDAR signal, calibrating the wheel encoder signal to the LiDAR signal and calibrating the camera signal to the wheel encoder signal based on the calibration of the camera signal to the LiDAR signal and the wheel encoder signal to the LiDAR signal.

Another example method of wheel encoder to camera calibration, including receiving a LiDAR signal, receiving a camera signal, receiving a wheel encoder signal, determining a camera signal to wheel encoder signal scaling factor, determining a LiDAR signal to wheel encoder signal scaling factor, estimating the wheel encoder signal indicating a rotation in an X-direction without the rotation about a Z-axis based on the camera signal to wheel encoder signal scaling factor and the LiDAR signal to wheel encoder signal scaling factor, determining a wheel encoder translation in the X-direction without the rotation about the Z-axis and calibrating the camera signal to the wheel encoder signal based on the calibration of the camera signal to the LiDAR signal and the wheel encoder signal to the LiDAR signal.

DETAILED DESCRIPTION OF THE INVENTION

The embodiments listed below are written only to illustrate the applications of this apparatus and method, not to limit the scope. The equivalent form of modifications towards this apparatus and method shall be categorized as within the scope the claims.

Certain terms are used throughout the following description and claims to refer to particular system components. As one skilled in the art will appreciate, different companies may refer to a component and/or method by different names. This document does not intend to distinguish between components and/or methods that differ in name but not in function.

In the following discussion and in the claims, the terms "including" and "comprising" are used in an open-ended fashion, and thus may be interpreted to mean "including, but not limited to . . . " Also, the term "couple" or "couples" is intended to mean either an indirect or direct connection. Thus, if a first device couples to a second device that connection may be through a direct connection or through an indirect connection via other devices and connections.

Figure 1:
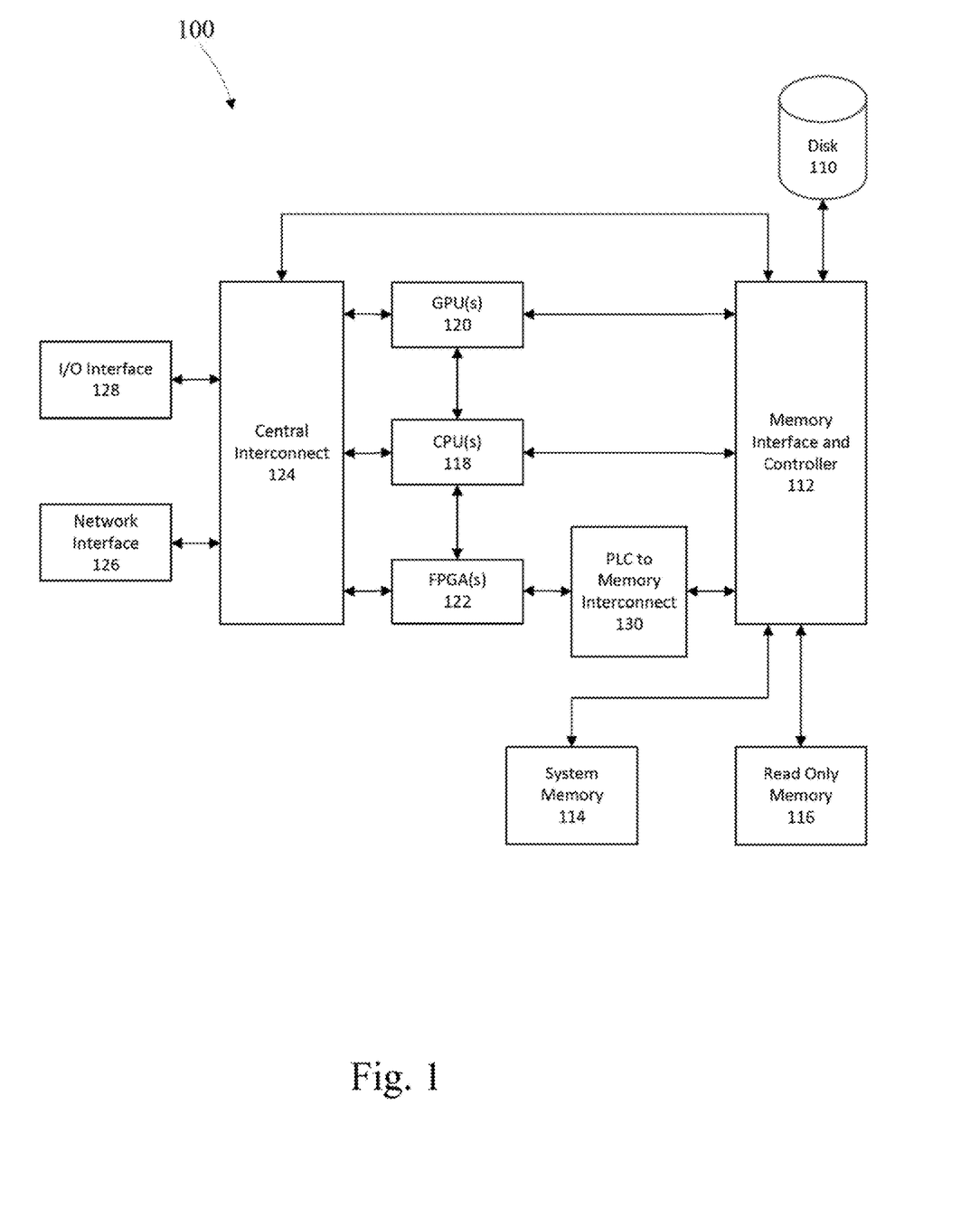
FIG. 1 is a first example system diagram in accordance with one embodiment of the disclosure.
Figure 6:
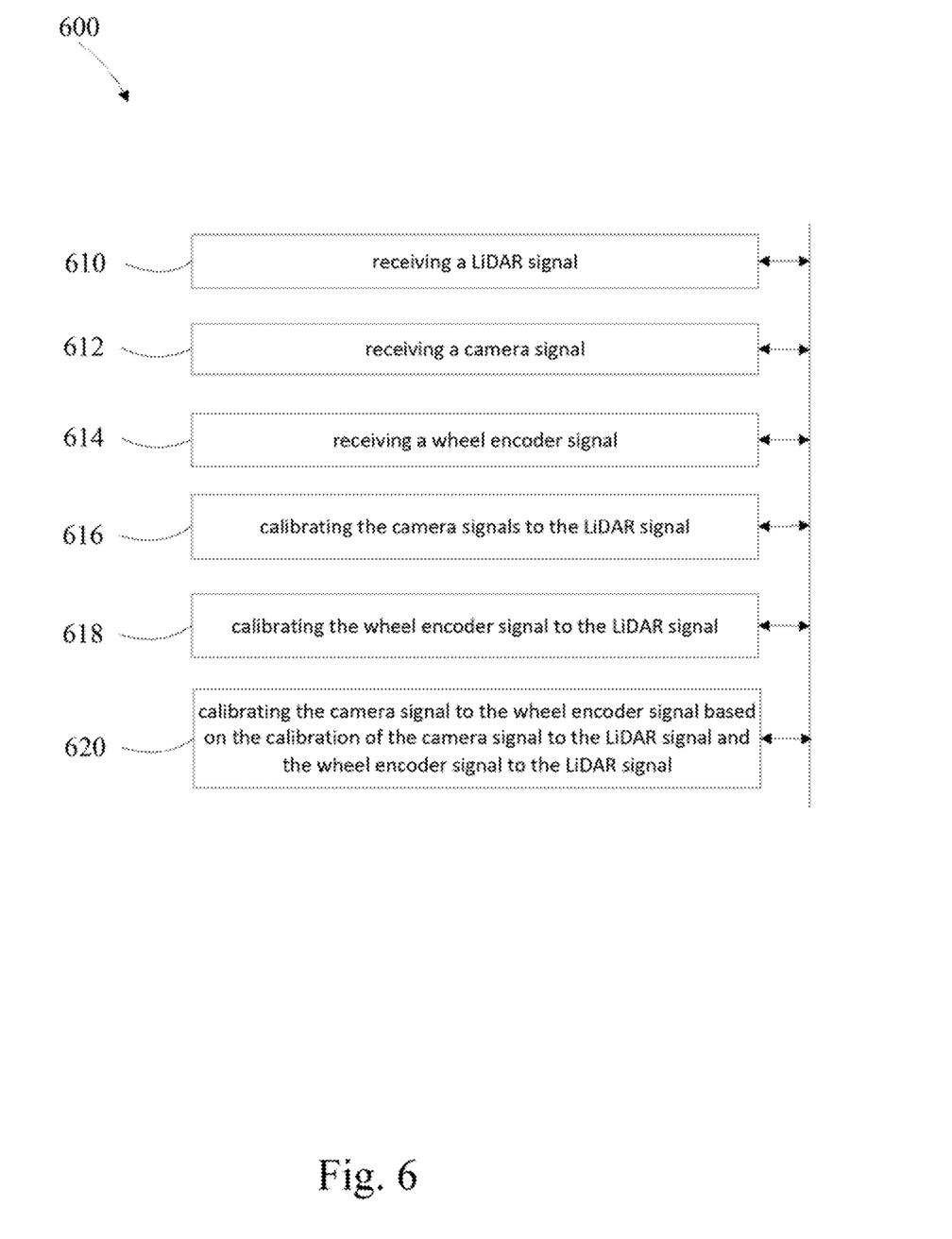
FIG. 6 is a first example method in accordance with one embodiment of the disclosure.
Figure 7:
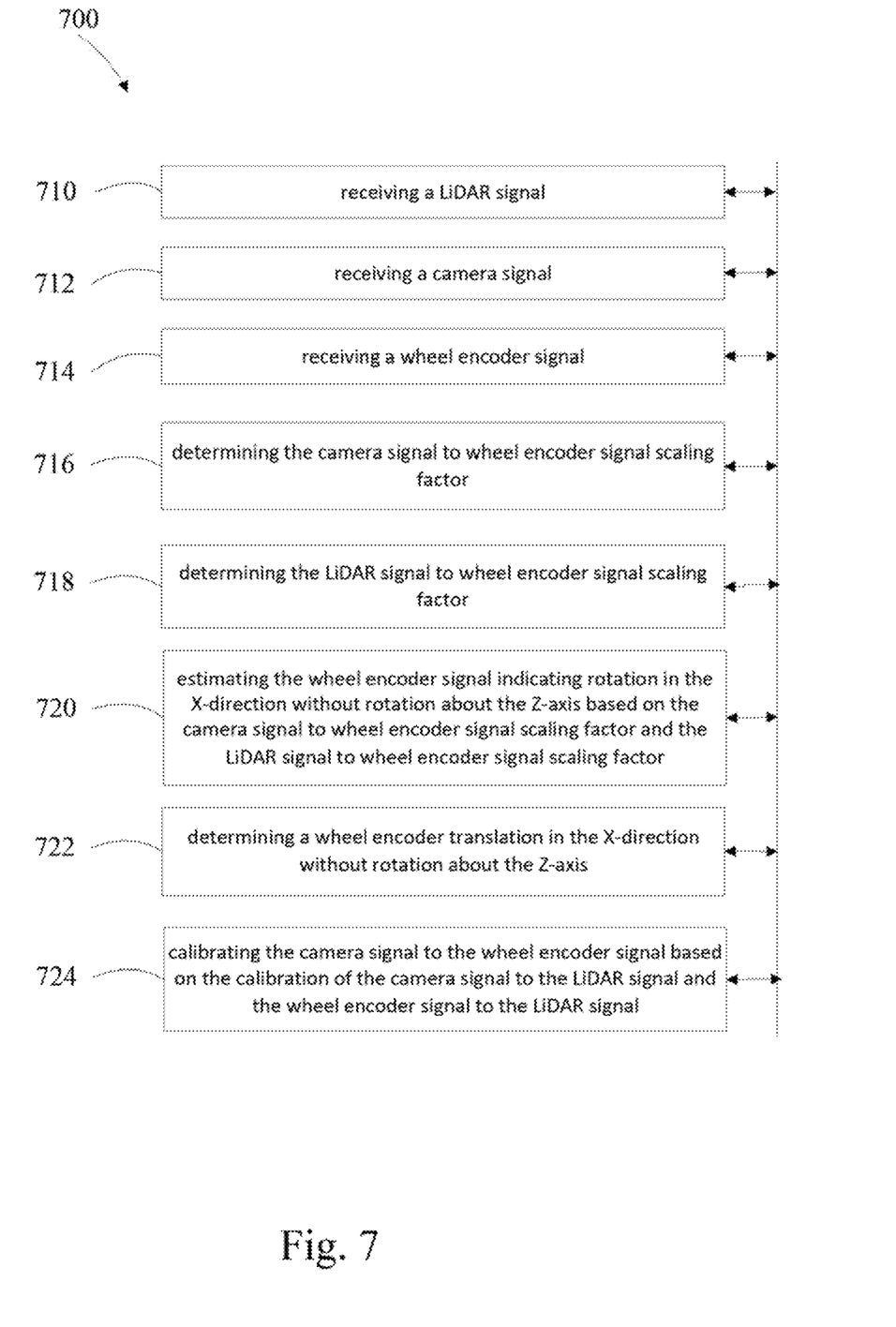
FIG. 7 is a second example method in accordance with one embodiment of the disclosure.

FIG. 1 depicts an example hybrid computational system 100 that may be used to implement neural nets associated with the operation of one or more portions or steps of the processes depicted in FIGS. 6-7. In this example, the processors associated with the hybrid system comprise a field programmable gate array (FPGA) 122, a graphical processor unit (GPU) 120 and a central processing unit (CPU) 118.

The CPU 118, GPU 120 and FPGA 122 have the capability of providing a neural net. A CPU is a general processor that may perform many different functions, its generality leads to the ability to perform multiple different tasks, however, its processing of multiple streams of data is limited and its function with respect to neural networks is limited. A GPU is a graphical processor which has many small processing cores capable of processing parallel tasks in sequence. An FPGA is a field programmable device, it has the ability to be reconfigured and perform in hardwired circuit fashion any function that may be programmed into a CPU or GPU. Since the programming of an FPGA is in circuit form, its speed is many times faster than a CPU and appreciably faster than a GPU.

There are other types of processors that the system may encompass such as an accelerated processing unit (APUs) which comprise a CPU with GPU elements on chip and digital signal processors (DSPs) which are designed for performing high speed numerical data processing. Application specific integrated circuits (ASICs) may also perform the hardwired functions of an FPGA; however, the lead time to design and produce an ASIC is on the order of quarters of a year, not the quick turn-around implementation that is available in programming an FPGA.

The graphical processor unit 120, central processing unit 118 and field programmable gate arrays 122 are connected and are connected to a memory interface controller 112. The FPGA is connected to the memory interface through a programmable logic circuit to memory interconnect 130. This additional device is utilized due to the fact that the FPGA is operating with a very large bandwidth and to minimize the circuitry utilized from the FPGA to perform memory tasks. The memory and interface controller 112 is additionally connected to persistent memory disk 110, system memory 114 and read only memory (ROM) 116.

The system of FIG. 1A may be utilized for programming and training the FPGA. The GPU functions well with unstructured data and may be utilized for training, once the data has been trained a deterministic inference model may be found and the CPU may program the FPGA with the model data determined by the GPU.

The memory interface and controller is connected to a central interconnect 124, the central interconnect is additionally connected to the GPU 120, CPU 118 and FPGA 122. The central interconnect 124 is additionally connected to the input and output interface 128 and the network interface 126.

Figure 2:
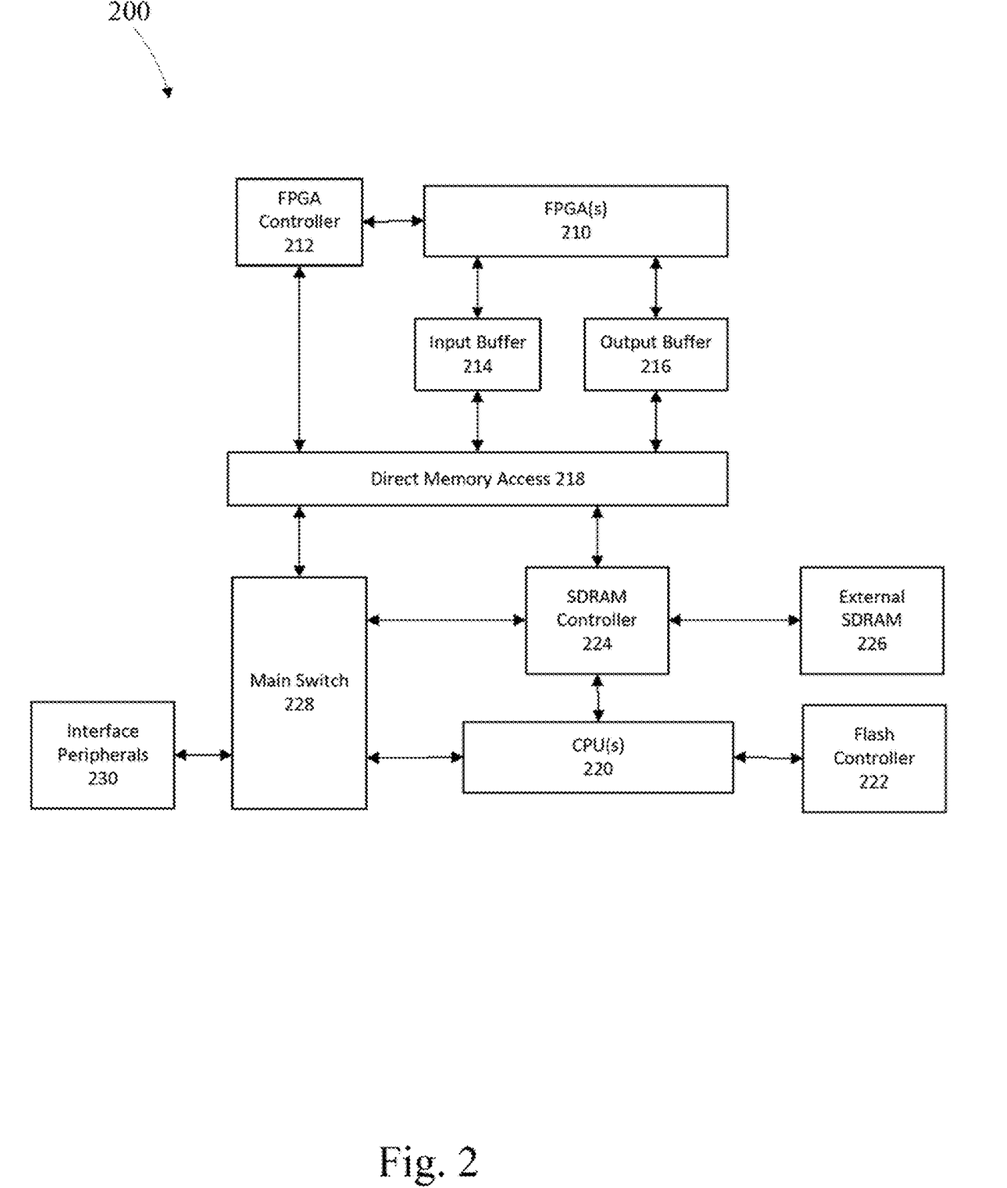
FIG. 2 is a second example system diagram in accordance with one embodiment of the disclosure.

FIG. 2 depicts a second example hybrid computational system 200 that may be used to implement neural nets associated with the operation of one or more portions or steps of process 1000. In this example, the processors associated with the hybrid system comprise a field programmable gate array (FPGA) 210 and a central processing unit (CPU) 220.

The FPGA is electrically connected to an FPGA controller 212 which interfaces with a direct memory access (DMA) 218. The DMA is connected to input buffer 214 and output buffer 216, which are coupled to the FPGA to buffer data into and out of the FPGA respectively. The DMA 218 includes of two first in first out (FIFO) buffers one for the host CPU and the other for the FPGA, the DMA allows data to be written to and read from the appropriate buffer.

On the CPU side of the DMA are a main switch 228 which shuttles data and commands to the DMA. The DMA is also connected to an SDRAM controller 224 which allows data to be shuttled to and from the FPGA to the CPU 220, the SDRAM controller is also connected to external SDRAM 226 and the CPU 220. The main switch 228 is connected to the peripherals interface 230. A flash controller 222 controls persistent memory and is connected to the CPU 220.

The calibration of a wheel encoder to a camera may be model-based or model free. Model based calibration includes a control field having a ground truth. In model-based methods, the control field may utilize previously designed objects to be viewed by the camera. Model-free calibration does not utilize a control field, however, these may have increased complexity, utilizing online initialization. The wheel encoder data may be obtained without utilization of a control field.

For a large sensor platform, the control field may be larger than those utilized for smaller robots. Rolling boards may be utilized to rotate the vehicle, alleviating the control field's view occupancy by the cameras.

One possible solution may utilize a LiDAR (Light Detection and Ranging) to bifurcate the wheel encoder to camera calibration into two portions, a camera to LiDAR calibration and a wheel encoder to LiDAR calibration. The camera to LiDAR calibration process may be performed using data captured statically, without moving sensors, therefore utilizing a relatively small control field. The wheel encoder to LiDAR calibration utilizes a sensor platform's movement, which would capture a wheel encoder's data to solve for hand-eye calibration.

This disclosure depicts a possible solution for wheel encoder to camera calibration utilizing the LiDAR as the bridge, so that a control field may be utilized for model-based calibration and the LiDAR motion may be estimated for hand-eye calibration.

A multi-sensor platform may be utilized in robotics and autonomous driving systems. To more accurately fuse information from different sensors, calibration may be utilized to determine the coordinate system transform relationships between sensors, including different mode sensors, such as GPS (Global Positioning System), IMU (Inertial Measurement Unit), wheel encoders, cameras, LiDAR, radar and the like.

A wheel encoder may be utilized as a sensor for vehicles and robots for localization. By integrating encoder measurements, determination may be made of the rotation and translation between the robot platform and/or the vehicle's poses. In contrast to IMU and cameras, the wheel encoder data may demonstrate high accuracy over short periods of time.

Calibration of a wheel encoder to a camera may make available data fusion to allow a hand-eye calibration. LiDAR may be another sensor to capture a 3-D point cloud of the sensing environment. The LiDAR may be limited by cost, distance and dark materials which don't reflect. The camera to LiDAR calibration may also be utilized for sensor fusion, either for perception or for localization mapping.

The instant disclosure proposes a method of utilizing a LiDAR to separate the wheel encoder to calibration into two portions, a camera to LiDAR calibration and a wheel encoder to LiDAR calibration.

Figure 3:
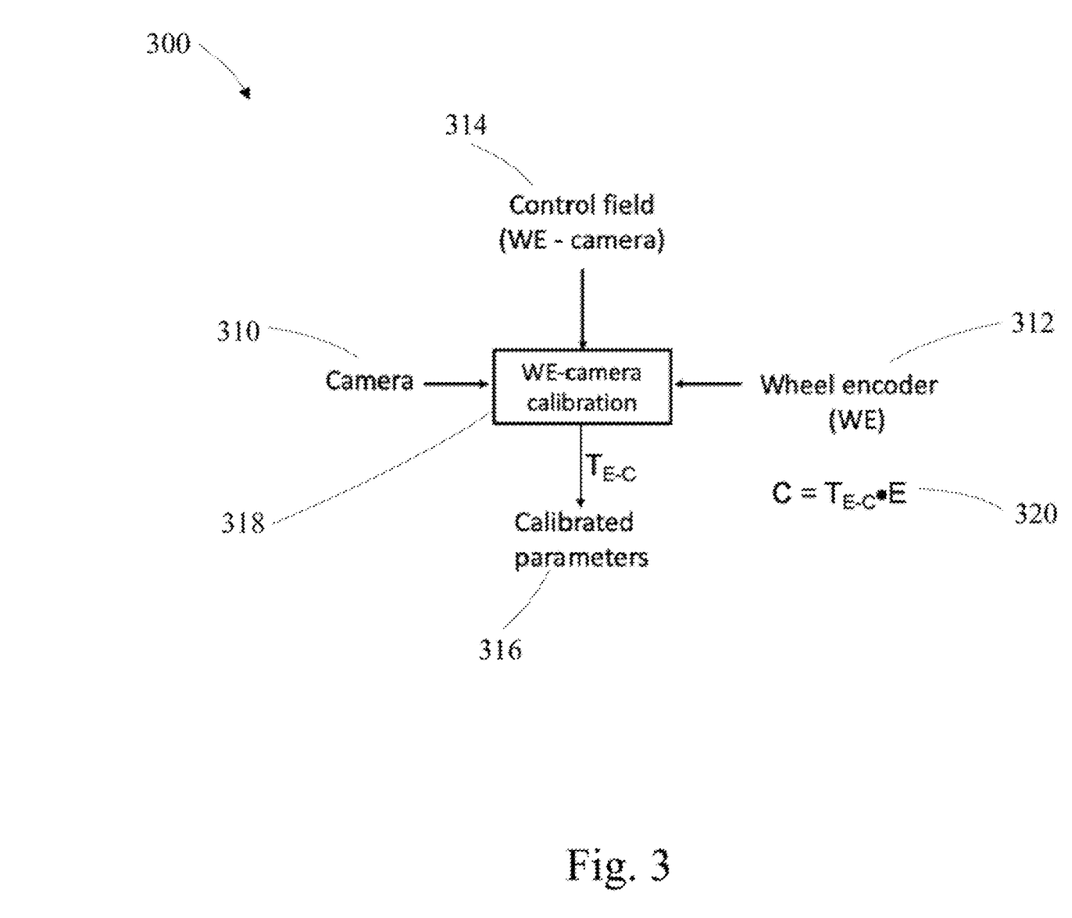
FIG. 3 is an example wheel encoder to camera calibration in accordance with one embodiment of the disclosure.

FIG. 3 depicts a coordinate relationship 300 between a wheel encoder 312 and a camera 310 in a sensor platform, including a control field 314 and calibration parameters 316, if C is the camera coordinate system and E is the wheel encoder coordinate system, then the wheel encoder (WE) to camera calibration 318 result may be termed $T_{E-C}$, then $$C = T_{E-C} \cdot E \; 320.$$

Figure 4:
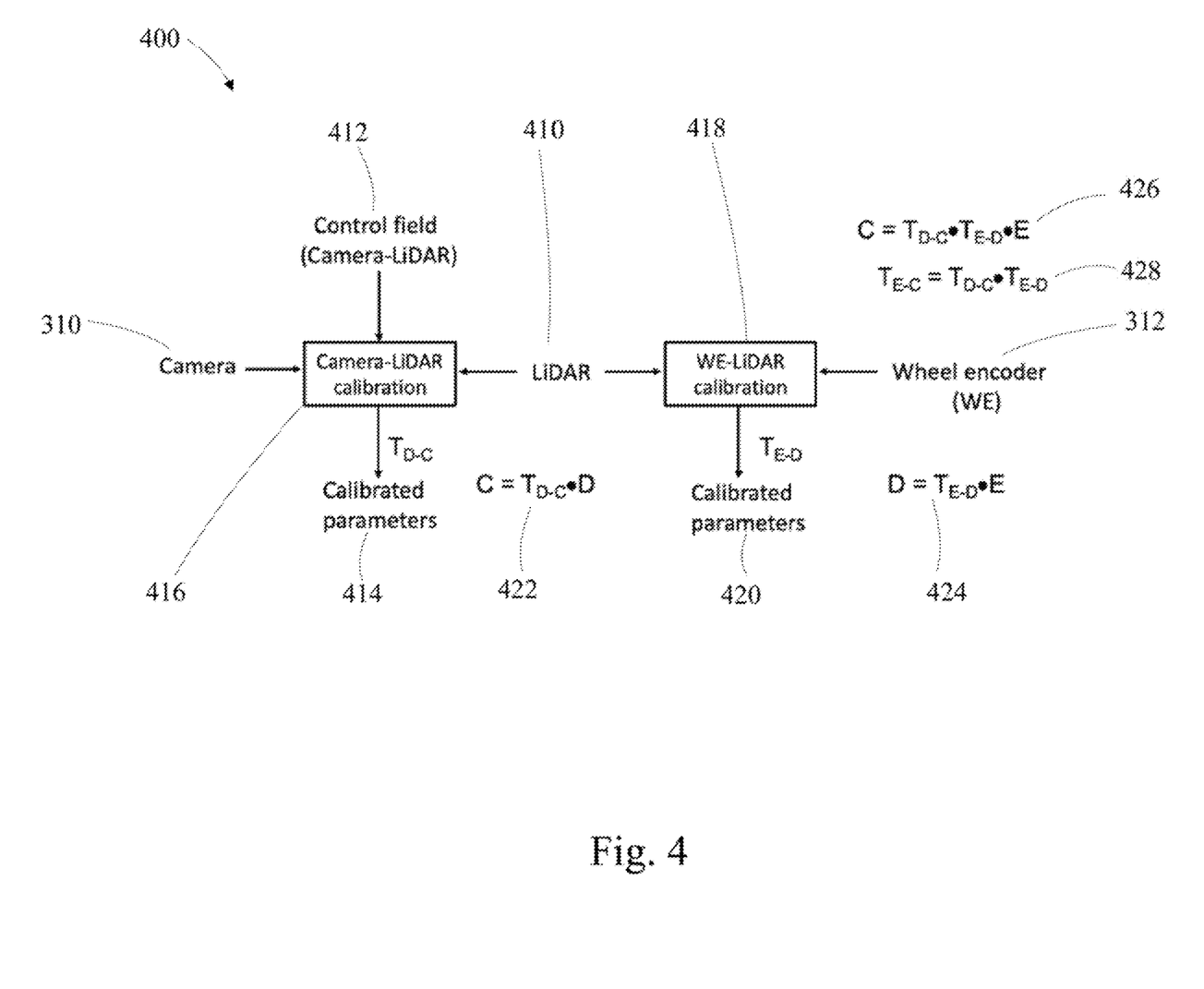
FIG. 4 is an example camera to LiDAR calibration and wheel encoder to LiDAR calibration in accordance with one embodiment of the disclosure.

FIG. 4 depicts LiDAR 410 added to this system 400, D is the LiDAR coordinate system. The calibration 416 of the camera 310 to LiDAR 410 including the control field 412 and the calibration parameters 414 will be termed $T_{D-C}$, and the calibration result of the wheel encoder to LiDAR may be termed $T_{E-D}$, then $$D = T_{E-D} \cdot E \; 424, \text{ (calibration 418 of WE 312 to LiDAR 410)}$$

$$C = T_{D-C} \cdot D \; 422, \text{ (calibration 416 of camera 310 to LiDAR 410)}$$

$$C = T_{D-C} \cdot T_{E-D} \cdot E \; 426,$$

$$T_{E-C} = T_{D-C} \cdot T_{E-D} \; 428.$$

Figure 5:
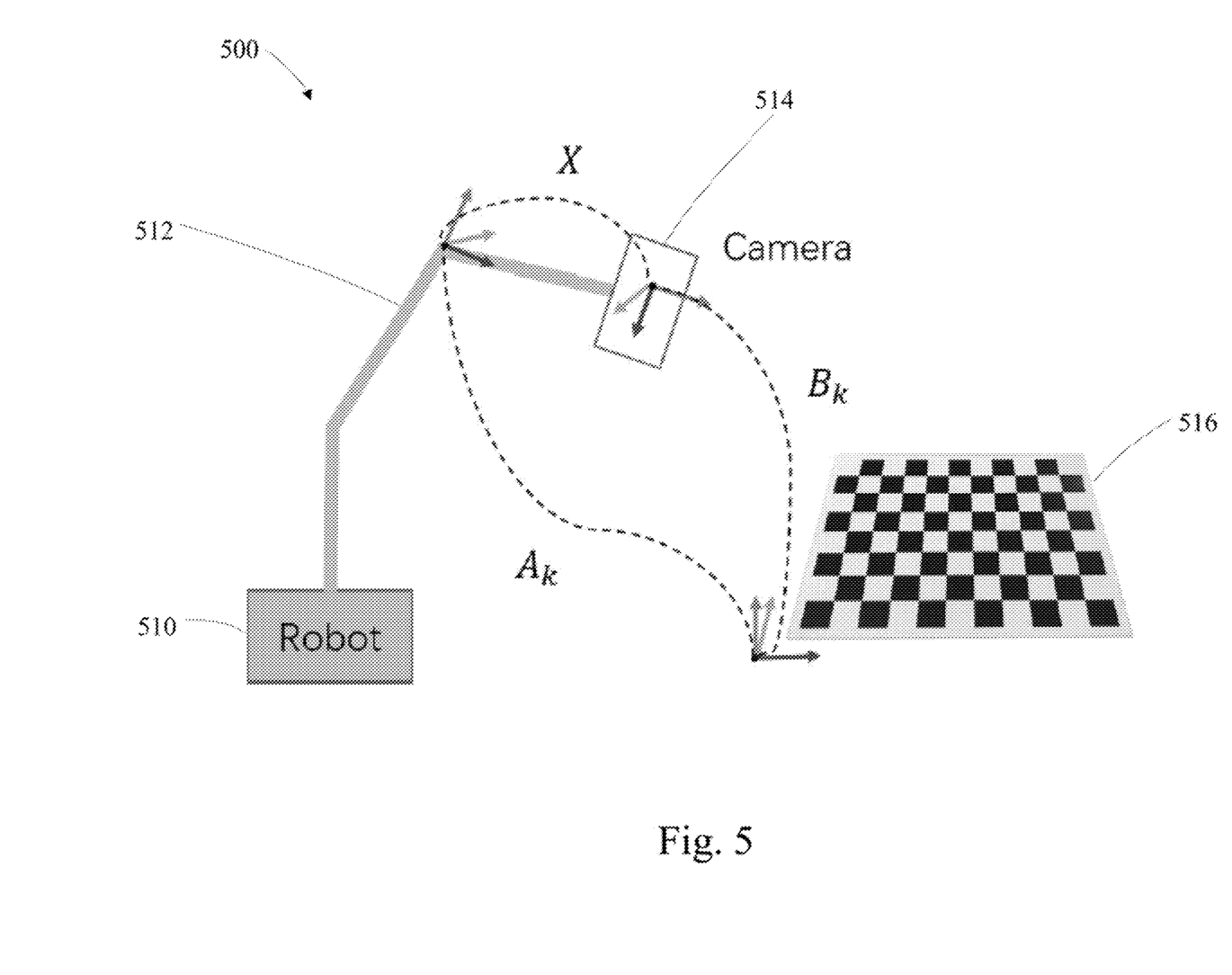
FIG. 5 is an example hand-eye calibration in accordance with one embodiment of the disclosure.

FIG. 5 depicts a sensor 514 may mounted on a robot hand 512 of a robot 510, the relationship between the sensor and the hand is termed the hand-eye calibration. In this example, the sensor eye may be camera 514.

In FIG. 5, $A_k$ and $B_k$ are the motions of the robot hand during the time period k, X may the relationship between robot hand and sensor eye. The checker board 516 may represent the control field to estimate the sensor eye local motions. The camera motion is limited to the poses where the sensor eye can see the control field.

The hand-eye calibration equation may be formulated as AX=BX, from which is derived:

$$\begin{cases} R_A R_X = R_X R_B \\ R_A t_X + t_A = R_X t_B + t_X \end{cases}$$

$$A = \begin{bmatrix} R_A & t_A \\ 0 & 1 \end{bmatrix}, B = \begin{bmatrix} R_B & t_B \\ 0 & 1 \end{bmatrix}, X = \begin{bmatrix} R_x & t_x \\ 0 & 1 \end{bmatrix}$$

Where A, B, X are decomposed into the rotation R and translation t components.

If there are at least two groups of motion measurements with different rotational axis, this problem is solvable. If the motion is constrained to an X-Y plane then Z component movement may be assumed to be zero.

For a wheel encoder, the motion equation may described by $$\begin{bmatrix} \dot{\theta} \\ \dot{x} \\ \dot{y} \end{bmatrix} = \begin{bmatrix} 1 & 0 & 0 \\ 0 & \cos(\theta) & -\sin(\theta) \\ 0 & \sin(\theta) & \cos(\theta) \end{bmatrix} \begin{bmatrix} \omega \\ v_x \\ 0 \end{bmatrix} = \begin{bmatrix} \omega \\ \cos(\theta)v_x \\ \sin(\theta)v_x \end{bmatrix}$$

Where v may the speed vector (the frontal component $v_x$ along the x axis, assuming the lateral component $v_y=0$), $\theta$ may the yaw angle and $\omega$ may the yaw rate, then $$\omega=(\omega_L r_L+\omega_R r_R)/2$$

$$\omega=(\omega_R r_R-\omega_L r_L)/b$$

With $r_L$, $r_R$ and b being the wheel encoder intrinsic parameters, left, right wheel radius and distance between two wheel centroids.

To calibrate the wheel encoder, its integration may be performed utilizing the Euler method, the second-order Runge-Kutta method and/or the Li Group closed form method and the like.

The wheel encoder-camera calibration may be implemented utilizing hand-eye calibration. Given the control field, the predefined check board and/or the scaling factor may be determined. The rotation part of X may be estimated with the absence of a rotation component around the Z axis, due to plane motion, then the translation vector may be determined without the Z component as well, as well utilizing the wheel encoder's intrinsic parameters.

Replacing camera motion estimation with LiDAR motion estimation, the LiDAR wheel encoder calibration may be done utilizing the same hand-eye calibration procedure.

The calibration of multiple cameras utilizes image features viewed from different cameras and matched. To calibrate the camera to LiDAR, the LiDAR's point cloud is matched to the image pixels from the same scene point.

LiDAR motion may be estimated with a LiDAR odometry or SLAM. LiDAR may capture a 3D point cloud and then its SLAM may be solved by 3D-to-3D mapping.

A possible solution for camera to wheel encoder calibration utilizing a LiDAR as the bridge has been described. This may allow a controlled field for model-based calibration and the LiDAR motion may be estimated to solve the hand-eye calibration problem.

FIG. 6 depicts an example method of wheel encoder to camera calibration, including receiving 610 a LiDAR signal, receiving 612 a camera signal and receiving 614 a wheel encoder signal. The method includes calibrating 616 the camera signal to the LiDAR signal, calibrating 618 the wheel encoder signal to the LiDAR signal and calibrating 620 the camera signal to the wheel encoder signal based on the calibration of the camera signal to the LiDAR signal and the wheel encoder signal to the LiDAR signal.

The method may further include matching a LiDAR signal point cloud of the LiDAR signal to an image pixel of the camera signal for a scene point, determining a scaling factor for the camera signal to wheel encoder signal calibration and estimating a rotation of the wheel encoder signal to the camera signal for a plane motion translation in only one plane.

The method may also include rotating a transport that receives the LiDAR signal, the camera signal and the wheel encoder signal via a rolling board, determining a camera signal to wheel encoder signal scaling factor, estimating the wheel encoder signal indicating a rotation in an X-direction without the rotation about a Z-axis and determining a wheel encoder translation in the X-direction without the rotation about the Z-axis.

The method may include determining a LiDAR signal to wheel encoder signal scaling factor, estimating the wheel encoder signal indicating a rotation in an X-direction without the rotation about a Z-axis and determining a translation in the X-direction without the rotation about the Z-axis. The camera signal to wheel encoder signal calibration and or the wheel encoder signal to LiDAR signal calibration may be a hand-eye calibration method. The camera signal to LiDAR signal calibration may be performed statically and the wheel encoder signal to LiDAR signal calibration may be performed dynamically.

FIG. 7 depicts another example method of wheel encoder to camera calibration, including receiving 710 a LiDAR signal, receiving 712 a camera signal and receiving 714 a wheel encoder signal. The method includes determining 716 a camera signal to wheel encoder signal scaling factor, determining 718 a LiDAR signal to wheel encoder signal scaling factor and estimating 720 the wheel encoder signal indicating a rotation in an X-direction without the rotation about a Z-axis based on the camera signal to wheel encoder signal scaling factor and the LiDAR signal to wheel encoder signal scaling factor. The method also includes determining 722 a wheel encoder translation in the X-direction without the rotation about the Z-axis and calibrating 724 the camera signal to the wheel encoder signal based on the calibration of the camera signal to the LiDAR signal and the wheel encoder signal to the LiDAR signal.

The method may include matching a LiDAR signal point cloud of the LiDAR signal to an image pixel of the camera signal for a scene point and rotating a transport that receives the LiDAR signal, the camera signal and the wheel encoder signal via a rolling board. The camera signal to LiDAR signal calibration may be performed statically and the wheel encoder signal to LiDAR signal calibration may be performed dynamically.

Those of skill in the art would appreciate that the various illustrative blocks, modules, elements, components, methods, and algorithms described herein may be implemented as electronic hardware, computer software, or combinations of both. To illustrate this interchangeability of hardware and software, various illustrative blocks, modules, elements, components, methods, and algorithms have been described above generally in terms of their functionality. Whether such functionality is implemented as hardware or software depends upon the particular application and design constraints imposed on the system. Skilled artisans may implement the described functionality in varying ways for each particular application. Various components and blocks may be arranged differently (e.g., arranged in a different order, or partitioned in a different way) without departing from the scope of the subject technology.

It is understood that the specific order or hierarchy of steps in the processes disclosed is an illustration of example approaches. Based upon design preferences, it is understood that the specific order or hierarchy of steps in the processes may be rearranged. Some of the steps may be performed simultaneously. The accompanying method claims present elements of the various steps in a sample order, and are not meant to be limited to the specific order or hierarchy presented.

The previous description is provided to enable any person skilled in the art to practice the various aspects described herein. The previous description provides various examples of the subject technology, and the subject technology is not limited to these examples. Various modifications to these aspects may be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." Unless specifically stated otherwise, the term "some" refers to one or more. Pronouns in the masculine (e.g., his) include the feminine and neuter gender (e.g., her and its) and vice versa. Headings and subheadings, if any, are used for convenience only and do not limit the invention. The predicate words "configured to" "operable to", and "programmed to" do not imply any particular tangible or intangible modification of a subject, but, rather, are intended to be used interchangeably. For example, a processor configured to monitor and control an operation or a component may also mean the processor being programmed to monitor and control the operation or the processor being operable to monitor and control the operation. Likewise, a processor configured to execute code may be construed as a processor programmed to execute code or operable to execute code.

A phrase such as an "aspect" does not imply that such aspect is essential to the subject technology or that such aspect applies to configurations of the subject technology. A disclosure relating to an aspect may apply to configurations, or one or more configurations. An aspect may provide one or more examples. A phrase such as an aspect may refer to one or more aspects and vice versa. A phrase such as an "embodiment" does not imply that such embodiment is essential to the subject technology or that such embodiment applies to configurations of the subject technology. A disclosure relating to an embodiment may apply to embodiments, or one or more embodiments. An embodiment may provide one or more examples. A phrase such as an "embodiment" may refer to one or more embodiments and vice versa. A phrase such as a "configuration" does not imply that such configuration is essential to the subject technology or that such configuration applies to configurations of the subject technology. A disclosure relating to a configuration may apply to configurations, or one or more configurations. A configuration may provide one or more examples. A phrase such as a "configuration" may refer to one or more configurations and vice versa.

The word "example" is used herein to mean "serving as an example or illustration." Any aspect or design described herein as "example" is not necessarily to be construed as preferred or advantageous over other aspects or designs.

Structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112, sixth paragraph, unless the element is expressly recited using the phrase "means for" or, in the case of a method claim, the element is recited using the phrase "step for." Furthermore, to the extent that the term "include," "have," or the like is used in the description or the claims, such term is intended to be inclusive in a manner similar to the term "comprise" as "comprise" is interpreted when employed as a transitional word in a claim.

References to "one embodiment," "an embodiment," "some embodiments," "various embodiments", or the like indicate that a particular element or characteristic is included in at least one embodiment of the invention. Although the phrases may appear in various places, the phrases do not necessarily refer to the same embodiment. In conjunction with the present disclosure, those skilled in the art may be able to design and incorporate any one of the variety of mechanisms suitable for accomplishing the above described functionalities.

It is to be understood that the disclosure teaches just one example of the illustrative embodiment and that many variations of the invention may easily be devised by those skilled in the art after reading this disclosure and that the scope of then present invention is to be determined by the following claims.

What is claimed is:

1. A method of wheel encoder to camera calibration, comprising:
   receiving a LiDAR signal;
   receiving a camera signal;
   receiving a wheel encoder signal;
   determining a camera signal to wheel encoder signal scaling factor;
   determining a LiDAR signal to wheel encoder signal scaling factor;
   estimating the wheel encoder signal indicating a rotation in an X-direction without a rotation about a Z-axis based on the camera signal to wheel encoder signal scaling factor and the LiDAR signal to wheel encoder signal scaling factor;
   determining a wheel encoder translation in the X-direction without the rotation about the Z-axis; and
   calibrating the camera signal to the wheel encoder signal based on the calibration of the camera signal to the LiDAR signal and die wheel encoder signal to the LiDAR signal, wherein the LiDAR signal is utilized as a bridge between the camera signal and the wheel encoder signal.

2. The method of wheel encoder to camera calibration of claim 1, further comprising matching a LiDAR signal point cloud of the LiDAR signal to an image pixel of the camera signal for a scene point.

3. The method wheel encoder to camera calibration of claim 1, wherein the camera sign LiDAR signal calibration is performed statically.

4. The method of wheel encoder to camera calibration of claim 1, wherein the wheel encoder signal to Li DAR signal calibration is performed dynamically.

5. The method of wheel encoder to camera calibration of claim 1, further comprising rotating a transport that receives the LiDAR signal, the camera signal and the wheel encoder signal via a rolling board.

* * * * *